United States Patent
Yu et al.

(10) Patent No.: US 6,628,947 B1
(45) Date of Patent: Sep. 30, 2003

(54) INTEGRATED WIRELESS/WIRELINE REGISTRATION

(75) Inventors: Christopher C. Yu, Naperville, IL (US); Douglas B. Alston, Fayetteville, GA (US); Oral A. Christie, Roswell, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/456,672

(22) Filed: Dec. 9, 1999

(Under 37 CFR 1.47)

(51) Int. Cl.[7] ................................................. H01S 4/00
(52) U.S. Cl. ...................................... 455/435; 455/422
(58) Field of Search ..................... 379/207.02; 455/435, 455/432, 433, 422, 461

(56) References Cited

U.S. PATENT DOCUMENTS

| | | | |
|---|---|---|---|
| 4,700,374 A | 10/1987 | Bini ............................. | 379/60 |
| 4,748,655 A | 5/1988 | Thrower et al. ............... | 379/60 |
| 4,833,702 A | 5/1989 | Shitara et al. ................ | 379/60 |
| 5,210,787 A | 5/1993 | Hayes et al. .................. | 379/60 |
| 5,319,699 A | 6/1994 | Kerihuel et al. .............. | 379/58 |
| 5,335,265 A | 8/1994 | Cooper et al. ................. | 379/59 |
| 5,353,331 A | 10/1994 | Emery et al. .................. | 379/58 |
| 5,664,005 A | 9/1997 | Emery et al. ................. | 455/422 |
| 5,751,789 A | * 5/1998 | Farris et al. | |
| 5,901,359 A | * 5/1999 | Malmstrom | |
| 6,151,500 A | * 11/2000 | Cardina et al. ............. | 455/435 |
| 6,216,000 B1 | * 4/2001 | Blumhardt | |
| 6,393,271 B1 | * 5/2002 | Dougherty | |
| 6,427,074 B1 | * 7/2002 | Chavez, Jr. et al. ........ | 455/417 |

FOREIGN PATENT DOCUMENTS

GB  2193861  2/1988

* cited by examiner

*Primary Examiner*—Creighton Smith
(74) *Attorney, Agent, or Firm*—Thomas, Kayden, Horstemeyer & Risley LLP

(57) ABSTRACT

A system and method are disclosed for routing telephone calls directed to a wireless unit located in the wireless network to a landline device located in the landline network. The system utilizes a location register in the form of a service control point (SCP) located in the landline network to store certain information pertaining to landline numbers and respective routing numbers associated with landline devices. The SCP is functionally coupled to a Visitors' Location Register (VLR) as well as to a landline network element that facilitates the routing of communications to both landline devices and over to the MTSO and its associated Home Location Register (HLR) in the wireless network. The system provides for the registering of the wireless unit with the landline network by the dialing of an administrative number from a landline device and causes the VLR in the landline network to directly communicate with the HLR in the wireless network to keep both the landline and the wireless networks up to date as to the registration status and specific routing for the various subscribers. The system is thereby able to route calls efficiently and to alleviate the tromboning effect that often occurs when calls are redirected from a wireless unit to a landline device.

21 Claims, 6 Drawing Sheets

INTEGRATED WIRELESS/WIRELINE REGISTRATION

FIELD OF THE INVENTION

This invention relates to the integration of the wireless and wireline networks and, in particular, to the integrated wireless/wireline registration that facilitates the routing of PCS calls to a landline device.

BACKGROUND OF THE INVENTION

Telephones are linked through telecommunication systems that include the public switched telephone network (PSTN), which is continually being improved through such developments as the Advanced Intelligent Network (AIN). Devices that are linked through the PSTN with the aid of the AIN include conventional telephones, radio telephones (often referred to as cordless phones), answering machines, facsimile (fax) machines, computers, and computer peripherals such as modems, printers and the like. These devices in most cases are physically linked to the PSTN through copper wire and in some cases fiber optic lines. Thus, these devices are referred to herein as "wireline" or "landline" devices. A telecommunications system such as the PSTN that serves wireline devices is referred to herein as a "wireline" or "landline" network.

A wireline device, as its name implies, keeps its user tied to a particular geographic location through a line connected to a wireline network. For example, a wireline device in a person's home or office may be used only in the limited area of that home or office. Based on this tie to particular geographic location, a subscriber's directory number in the wireline network generally is associated with the particular geographic location of the wireline devices used by the subscriber.

To break this tie to a particular geographic location, wireless telecommunications devices for use in wireless networks have been developed. A wireless telecommunications device is also referred to herein as a "wireless unit" or a "mobile unit". The most familiar wireless units are cellular phones, which are also referred to as mobile phones and, when used in a car, as car phones. But wireless units may include other communication devices that operate on principles of radio or microwave technology. The most familiar types of wireless networks include the cellular mobile radio telephone (CMR) system and the personal communication network (PCN).

A wireless unit does not fetter its user with ties to a particular geographic location. Rather, a wireless unit may be used anywhere within a geographic area served by the subscriber's wireless network or by another wireless network through arrangements for such service made with the subscriber's wireless network. Based on the mobile nature of a wireless unit, a call to a subscriber using a wireless unit is directed to a number that is associated with the wireless unit. In the CMR system, this number is often referred to as a subscriber's "cell phone number" or "mobile phone number."

Given the convenience of wireless units, their popularity is growing. But it is not yet an exclusively wireless world. For various reasons, including those of cost, infrastructure, and special services, a user may be a subscriber of both a landline service and a wireless service. For example, a salesperson may use a landline device in his or her home or office and may use a wireless unit in his or her car. In many cases, a subscriber's landline service is completely separate from the subscriber's wireless service. Where these services are separate, to reach a particular subscriber, a caller may have to call both the subscriber's landline directory number, which is associated with a particular geographic location, and the number which is associated with the subscriber's mobile unit. Trying to reach a subscriber by making two calls to two different numbers is inconvenient and inefficient. It is also inconvenient and inefficient to burden the subscriber with having to distribute more than one number to potential callers. It is further inconvenient and inefficient to burden a potential caller with having to know both of the numbers associated with the subscriber.

To overcome the problems associated with a subscriber having to use a landline device with a landline number and a wireless unit with a wireless number, some subscribers have made use of call forwarding services offered by the service providers of the landline service or the wireless service. For example, a subscriber may implement a call forwarding service with respect to his or her wireless number so that, for a time, all calls directed to the wireless number are forwarded to the landline number. A disadvantage of such an implementation of the call forwarding service is demonstrated in the case of a caller making a call from a wireless unit to the subscriber's landline number. The call is routed from the wireless network in which the caller's wireless unit is operating to the landline network in which the subscriber's landline device is located. But as noted, the subscriber's landline number has a call forwarding service implemented on it so that calls are forwarded to the subscriber's wireless unit. So, in this example, the call from the caller using the wireless unit is routed back from the landline network in which the subscriber's landline device is located to the wireless network in which the subscriber's wireless unit is located. This back-and-forth routing of a call from a first network to a second network and then back to the first network is known as "tromboning" or the "tromboning effect".

FIG. 1 illustrates a case of tromboning with respect to a call that is routed from the landline network 12 to the wireless network 14 and back to the landline network 12. In this second example, assume a subscriber has implemented the call forwarding service on his or her wireless number associated with wireless unit 28d so that all calls to the wireless number are forwarded to the subscriber's landline number (associated with landline unit 16d). Also assume that a caller uses his or her landline device 16a to dial a call to the subscriber's wireless number. The call originates in the landline network 12 and is routed from the caller's landline unit 16a as indicated by arrow A through the service switching point (SSP) 18a and as indicated by arrow B to access tandem 20. From the access tandem 20, the call is routed to the wireless network 14, and in particular, through the access tandem 20 as indicated by arrow C to the mobile telephone switching office (MTSO) 22 serving the wireless number.

As a result of the implementation of the call forwarding service on the wireless number, a check of the home location register (HLR) 24, as indicated by arrows D and E, results in forwarding of the call from the subscriber's wireless number to the subscriber's landline number. Thus, the call is routed from MTSO 22 as indicated by arrow F through access tandem 20 and back to the landline network 12. In particular, from access tandem 20, as indicated by arrow G, the call is routed to the SSP 18b which serves the subscriber's landline number. From the SSP 18b, as indicated by arrow H, the call is terminated to the wireline device 16d associated with the subscriber's landline number. Thus, the call suffers from the tromboning effect by being routed: (1) from the landline network 12 to the wireless network 14 as indicated by arrows A, B, and C; and (2) back from the wireless network 14 to the landline network 12 as indicated by arrows D, E, F, G, and H.

In this example, tromboning occurs with respect to this call for the following reasons: (1) the call originates in a first network; (2) the information with respect to the call forwarding service is located in a second network; and (3) the call forwarding information indicates that the call is to be routed back to the first network. In other words, the call has to cross from the first to the second network so as to obtain the information that the call must double back to the first network.

The tromboning of a call adversely impacts the call because the back-and-forth routing of the call from one network to another and back to the first network results in a delay in the processing of the call. In addition, the tromboning of a call has negative consequences on the networks that are involved in the back-and-forth routing of the call, because the tromboning detrimentally occupies network resources that otherwise could be used to handle other traffic.

The tromboning effect and its problems have been described in the context of back-and-forth routing between a landline network and a wireless network that results from the implementation of a call forwarding service. But the tromboning effect may occur between any two communication networks where a call or other communication originates with a first network, is routed to a second network, and then is re-routed for termination or connection to a unit operating in the first network.

Accordingly, there is a need for a method and system that overcomes the problems associated with a telecommunications subscriber having to keep track of two different numbers and possibly having to dial two different numbers (a landline number and a wireless number) to reach a subscriber who utilizes both landline service and wireless services.

There is also a need for a method and system that prevents the tromboning effect with respect to the routing of a call or other communication from a first device to a second device.

There further is a need for a method and system that prevents the tromboning effect with respect to the routing of a call or other communication between two communication networks wherein a call or other communication originates with a first network, is routed to a second network, and then is re-routed for termination or connection to a device operating in the first network.

SUMMARY OF THE INVENTION

The present invention addresses the above described needs by providing a system and method for routing telephone calls directed to a wireless unit located in a wireless network to a landline device located in a landline network. The present invention utilizes a location register in the form of a service control point (SCP) located in the landline network to store certain information pertaining to landline numbers and respective routing numbers associated with landline devices. Functionally coupled to the SCP is a Visitors' Location Register (VLR). The VLR facilitates the receiving of subscriber information from the wireless network relating to subscriber identity and verification as well as the features and services to which the subscriber has subscribed. Additionally, the SCP is also functionally coupled to a landline network element that facilitates the routing of communications both to landline devices and over to the wireless network. In general, the landline network element is in the form of an Access Tandem (AT). In routing the communications to the landline devices, the communications are transmitted from the landline network element to the landline devices via Switch Servicing Points (SSP), of which each are individually capable of accessing numerous landline devices.

As the primary link between the landline network and the wireless network, the landline network element is functionally coupled to a Mobile Telephone Switching Office (MTSO) located in the wireless network. The MTSO houses the field monitoring and relay stations for switching calls between the wireless network and the landline network. Associated with the MTSO is a Home Location Register (HLR) that facilitates the storing of certain subscriber information used to identify and to verify a subscriber, as well as containing information on the features and services the to which subscriber subscribes. The MTSO completes the connections to the wireless units via individual cell sites positioned in various areas to provide coverage over a defined geographic area. The cell sites then transmit the calls to the wireless units in accordance with instructions received from the MTSO.

In particular, the routing of telephone calls, initially directed to a wireless unit located in the wireless network, to a landline device located in the landline network is primarily accomplished by registering the wireless unit with the landline network. The registering is accomplished by dialing an administrative number from the landline device where the subscriber wants their wireless calls to be directed. Once the administrative number is received by the AT in the landline network, a query is made by the AT into the SCP and associated VLR to see if the subscriber is identified and verified. If so, the wireline registration feature is set to the "on" state in the VLR in the landline network. Once set to the "on" state, the information is subsequently transmitted to the HLR in the wireless network. Upon receipt, the information within the HLR is updated to instruct that all calls directed to the subscriber's wireless number are to be directed to the landline number of the landline device from which the subscriber registered. The information transmitted to the HLR in the wireless network is transmitted directly from the SCP and associated VLR located in the landline network. Hence, the VLR in the landline network directly communicates with the HLR in the wireless network to keep both the landline and the wireless networks up to date as to the registration status and specific routing for the various subscribers.

By providing the capability for the VLR in the landline network to directly communicate with the HLR in the wireless network, both networks will be able to route the calls efficiently and alleviate the tromboning effect that often occurs when calls are redirected from a wireless unit to a landline device.

Accordingly, an object of the present invention is to provide a method and system that overcomes the problems associated with a telecommunications subscriber having to keep track of two different numbers and possibly having to dial two different numbers (a landline number and a wireless number) to reach a subscriber who utilizes both landline and wireless services.

Another object of the present invention is to provide a method and system that prevents the tromboning effect with respect to the routing of a call or other communication from a first device to a second device.

Another object of the present invention is to provide a method and system that prevents the tromboning effect with respect to the routing of a call or other communication between two communication networks wherein a call or other communication originates with a first network, is routed to a second network, and then is re-routed for termination or connection to a device operating in the first network.

Other objects, features, and advantages of the present invention will become apparent upon reading the following specification, when taken in conjunction with the drawings and the appended claims.

DETAILED DESCRIPTION

The present invention is directed to a telecommunications system and method therein for the routing of telecommunications between a wireless network having a mobile telephone switching office and a landline network that are functionally coupled to facilitate wherein the landline network includes a landline network element for routing communications directed to a wireless number to a landline device associated with a landline number. An advantage of the present invention is that the tromboning effect that frequently occurs when routing a call or other communication from a first device to second device or between two different communication networks is alleviated. Another advantage of the present invention is that a telecommunications subscriber does not need to keep track of two different numbers and possibly need to dial two different numbers in order to reach a subscriber on the move.

The detailed description which follows will first provide a brief general discussion on the Personal Communication Service (PCS) telecommunications environment within which the present invention is capable of operating. Then, after discussing the PCS environment in general, the wireline registration system according to the disclosed embodiment will be described in detail as utilized within the PCS environment. Finally, the overall operation of the wireline registration system of the disclosed embodiment will be discussed in detail within the context of its use within the PCS environment.

PCS Environment

To provide a better understanding of the present invention, a brief description will be provided of a PCS environment which is suitable for utilizing the present invention within. Although the disclosed embodiment of the present invention will be generally described in the context of the PCS environment, the present invention can also be implemented in conjunction with other telecommunications environments for fulfilling other types of call routing needs. Furthermore, although the embodiment of the present invention will be generally described in the context of an environment that includes both a landline network and a wireless network, the present invention can also be implemented in other environments that are limited to just one type of network.

Figure 1:
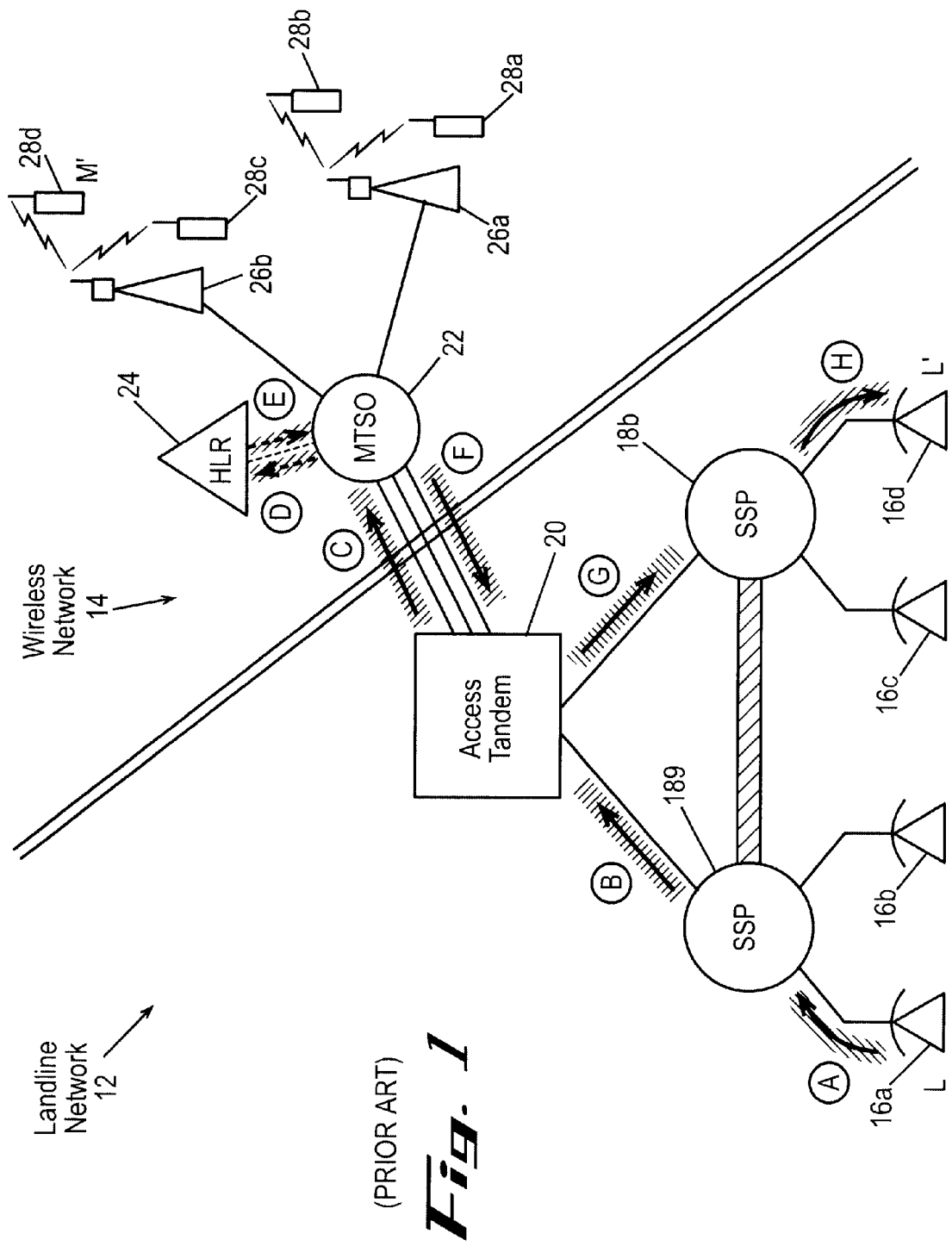
FIG. 1 is a block diagram of a PRIOR ART landline network functionally coupled to a wireless network.
Figure 2:
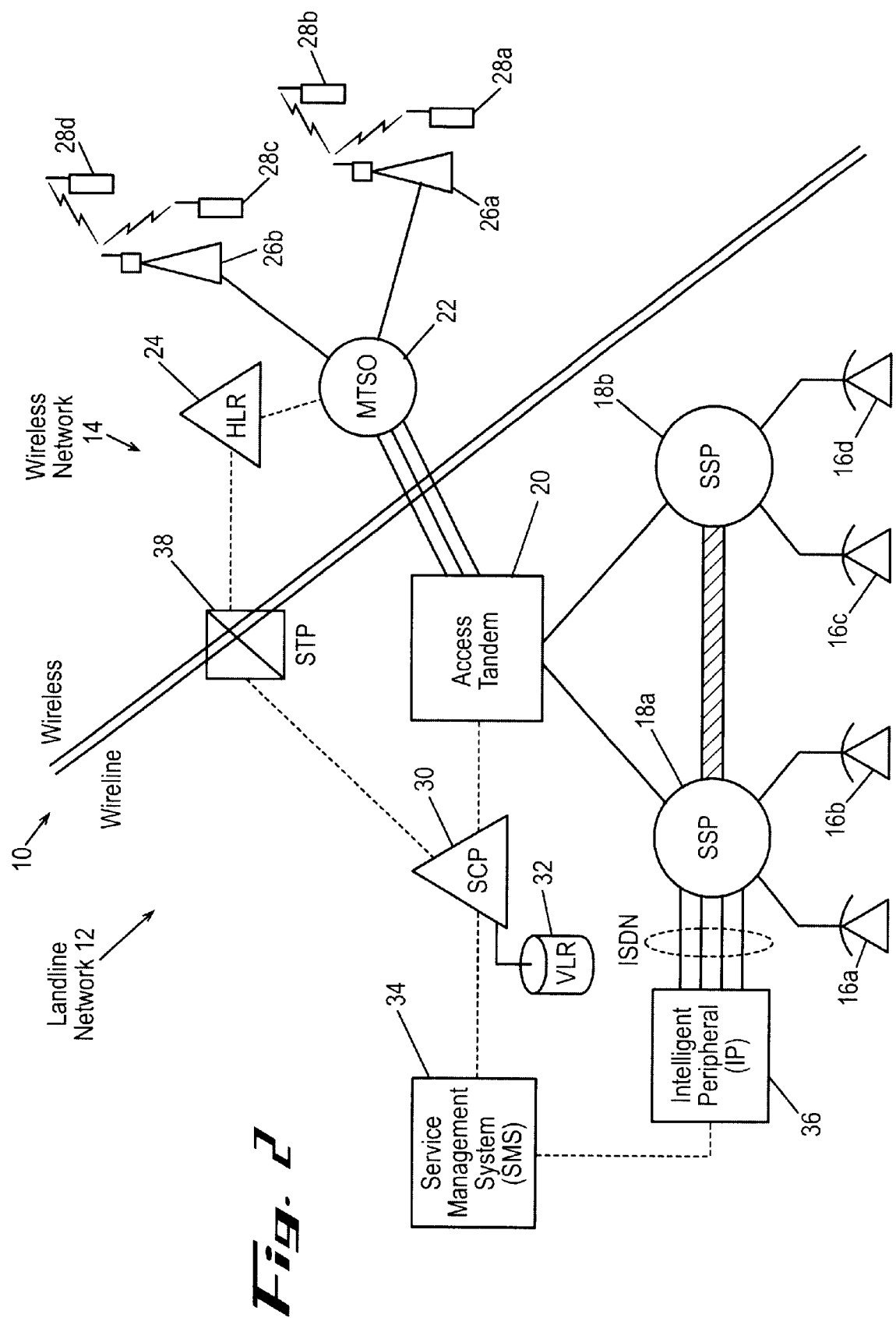
FIG. 2 is a block diagram of a landline network according to the disclosed embodiment functionally coupled to a wireless network.

The telecommunications service known as Personal Communications Service (PCS) was generally developed to facilitate the linking of a subscriber's landline service with his or her wireless service. Generally, PCS is an integrated landline/wireless service. Typically, the landline service utilized in PCS is provided through a landline network such as the public switched telephone network (PSTN), and the wireless service utilized in PCS is provided through a wireless network such as a cellular mobile radio (CMR) system or other radio or microwave technology system. FIG. 2 illustrates a PCS 10 including the pertinent portions of a landline network 12 and the pertinent portions of a wireless network 14 utilized in the disclosed embodiment of the present invention. With respect to the landline network 12, FIG. 2 illustrates a plurality of landline devices 16a, 16b, 16c and 16d, each of which is connected to one of two service switching points (SSPs) 18a, 18b. Each of the SSPs 18a, 18b is connected to an access tandem 20. Although not shown, each of the SSPs in the disclosed embodiment also has a connection to a control means that is operative to receive and to store a registration signal corresponding to a registration of a wireless unit and to transmit an activation signal to an element in the wireless network 14. By way of illustration, in the disclosed embodiment in FIG. 2, one type of control means is a service control point (SCP) 30. The SCP 30 further provides an indirect connection for the SSPs 18a, 18b to the service management system (SMS) 34. In addition, as further illustrated in FIG. 2, the SSP 18a is connected to an intelligent peripheral (IP) 36. The IP 36 may be a service node and may be connected to the SSP 18a through integrated services digital network (ISDN) lines. For further information regarding the referenced landline network including AIN aspects thereof, the interested reader is referred to U.S. Pat. No. 5,430,719 to Weisser, which is incorporated herein by reference.

In the PCS 10, the landline network 12 and wireless network 14 may be connected through various network elements. In general, in the disclosed embodiment in FIG. 2, the connection is provided by way of a routing means that is selectively operative for routing telecommunications directed to wireless and landline numbers. By way of illustration, one type of routing means is an Access Tandem (AT) 20. The AT 20 is functionally coupled between an element of the landline network 12 such as the SSP 18b and an element in the wireless network 14. In general, the AT 20 is functionally coupled to a switching means in the wireless network 14. Similar to the routing means in the landline network 12, the switching means provides for the routing of telecommunications within the wireless network 14. By way of illustration, in the disclosed embodiment in FIG. 2, one type of switching means is a Mobile Telephone Switching Office (MTSO) 22. An MTSO may also be referred to as a mobile switching center (MSC).

Another type of connection between the landline network 12 and wireless network 14 may be from the SCP 30 through a signal transfer point (STP) 38 to the MTSO 22, and in particular, to the home location register (HLR) 24 of the MTSO 22. The HLR 24 is typically used to keep track of wireless units associated with subscribers of the wireless network 14 and to store the subscriber identity/controlling the MTSO 22. The MTSO 22 is also connected to a plurality of base stations 26a, 26b which use radio or microwave technology to communicate with wireless devices 28, 28b, 28c and 28d. For further information regarding the referenced wireless network, the interested reader is referred to the patent to Comer, U.S. Pat. No. 5,610,973, which is incorporated herein by reference.

As noted above, the PCS 10 has been developed to link a subscriber's landline service with his or her wireless service. A PCS subscriber is assigned a PCS number which is the primary number to be used by callers trying to reach the subscriber. This PCS number in most cases is a number that is assigned to a subscriber's wireless unit 28. When the wireless service in PCS is a CMR system, then the PCS number may be a number assigned to the subscriber's cell phone number. When the term "PCS number" is used herein, it may be assumed that the reference is to a wireless number unless otherwise noted.

PCS operates as a wireless network in the case of a call that is directed to a subscriber's PCS number, which then is routed to the wireless unit 28 associated with the PCS number. But as noted, PCS is an integrated landline/wireless service. With respect to that integration, a subscriber may make use of the operation of PCS as a landline network 12. A caller may be able to reach the subscriber by calling the subscriber's landline directory number, which is referred to herein in the context of PCS as a base directory number (base DN). The subscriber's base DN is associated with the subscriber's PCS service. When the term "base DN" is used hereafter, it may be assumed that the reference is to a landline number unless otherwise noted.

As an integrated landline/wireless service, PCS overcomes some of the problems experienced by a subscriber who has a landline service separate from a wireline service. In particular, PCS typically solves the problem of a caller having to make separate calls to each of the subscriber's landline directory number and the subscriber's wireless number. One way in which PCS solves this problem is by allowing a subscriber to implement a feature which directs calls to the subscriber's PCS number in the wireless network 14 to the subscriber's landline number in the landline network 12. This feature is referred to hereinafter as "wireline registration." Advantageously, as is explained below, the wireline registration feature allows for the routing of a communication from wireless network 14 to the landline network 12 without the use of a service such as the call forwarding service.

Wireline Registration Setup

When a subscriber has effected wireline registration, all of the calls that are dialed to his or her PCS number are routed to his or her base DN. Generally, this routing of calls from the wireless network 14 to the landline network 12 is accomplished without a call forwarding service by having the landline number appear to the wireless network 14 as a "wireless number." The discussion which follows will first describe how a subscriber wireline registers and what takes place within the SCP 30 to effect the wireline registration. Next, several call flow descriptions will be discussed explaining how the wireline registration feature operates to route calls within the landline and wireless networks 12 and 14.

To effect wireline registration, the subscriber dials an administrative number from their landline device 16 in the landline network 12. This administrative number is predetermined and, when a call directed to this number is received in the landline network 12, it is indicative of a request for the registration of the respective wireless unit 28 associated with the administrative number. Thus, the call to an administrative number serves as a registration signal to be acted upon when received. In receiving the call from the landline number, certain identification information is associated with the call. This identification information together with additional information stored in the SCP 30 that associates the wireless number with the landline number forms the data and instructions that facilitate effecting wireline registration. The data and instructions are held in the VLR 32 of the SCP 30 and are also transmitted to the HLR 24. The data and instructions transmitted to the HLR 24 is thereby forming, in effect, an activation signal to the HLR 24 and MTSO 22.

After receiving the call directed to the administrative number, a recognition of the call is made based on the data and instructions. Once the recognition is made, the landline number is generally validated with respect to entitlement of the wireline registration feature. After validating the landline number, the wireline registration process stores the data and instructions in the VLR 32 (from the registration signal) and transmits the data and instructions (by way of the activation signal) to the HLR 24 associated with the MTSO 22. Thereafter, a confirmatory announcement is made to the caller indicating that the wireline registration is complete.

The data and instructions associated with the MTSO 22 are transmitted to the HLR 24 by a landline network element. For example, in FIG. 2, the SCP 30 can transmit the data and instructions to the HLR 24 via the STP 38. Alternatively, the access tandem 20 can receive the data and instructions from the SCP 30 and then transmit to the MTSO 22 and associated HLR 24. Generally, the data and instructions are held in the respective VLR 32 and HLR 24 data registers until the wireline registration setting is canceled. More details on the cancellation of wireline registration will be discussed below in conjunction with FIG. 6.

In addition, after recognizing the call but before validating the call, the system may present the caller with a menu of options of other service features which can be initiated through the use of the administrative number may be provided to the caller. The caller can then make a selection from the menu, whereupon a confirmatory announcement is made to the caller in response to the selection.

Once the wireline registration is complete, a call directed to the wireless unit 28 will trigger a query to be sent to the landline network element such as, for example, the SCP 30 in FIG. 2. The query to the landline network element will determine the landline number associated with the wireless number and will cause the call to be routed accordingly.

Figure 3:
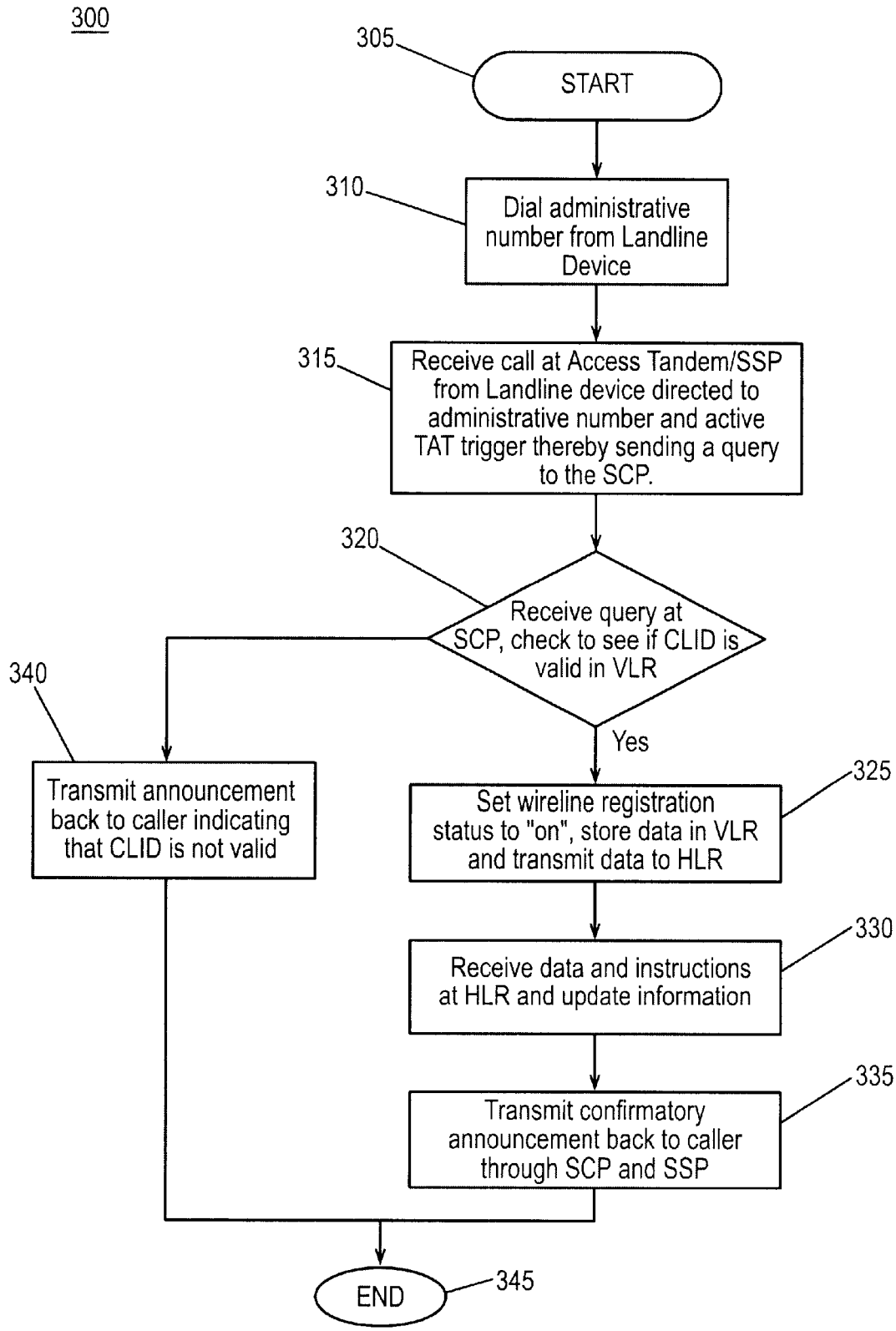
FIG. 3 is a flow diagram illustrating the steps of the disclosed embodiment for registration of a wireless unit in the landline network.

Referring now to FIG. 3, a flow diagram illustrates the general steps of a method 300 for accomplishing the wireline registration. Method 300 begins at step 305 and proceeds to step 310, where a caller dials the administrative number from a landline device 16. Next, at step 315, the call is received at the landline network element (the access tandem 20, or alternatively, an SSP 18) and is directed to an administrative number, whereupon a TAT trigger is activated thereby causing a query to be sent to the SCP 30. At step 320, the query is received by the SCP 30, and the landline number, by way of the calling number identification (CLID) information, is checked in the VLR 32 to determine if the landline number is valid and is entitled to use the wireline registration feature.

If it is determined at step 320 that the landline number is valid, the method 300 follows the "yes" branch to step 325. At step 325, the wireline registration status is set to "on" and the necessary data and instructions are stored in the VLR 32 as well as transmitted by the SCP 30 to the HLR 24. Next, at step 330, the HLR 24 receives the necessary data and instructions and updates its registers accordingly. At this point, the landline number (base DN) looks like a wireless number to the HLR 24 in the wireless network 14, and the wireless number of the subscriber looks like a landline number to the VLR 32 in the landline network 12. Once the HLR 24 has been updated with the necessary data and instructions, at step 335, a confirmatory announcement indicating that the wireline registration has been completed is transmitted back to the caller via the SCP 30 and the landline network element. Thereafter, the method 300 then proceeds to step 345 whereupon method 300 ends.

If it is determined at step 320 in FIG. 3 that the landline number is not valid, the method 300 follows the "no" branch to step 340. At step 340, an announcement is transmitted back to the caller via the SCP 30 and the landline network element indicating that the landline number (by way of the CLID information) is not valid. Thereafter, the method 300 again proceeds to step 345 whereupon the method 300 ends.

As can be seen, wireline registration can be accomplished by a subscriber simply placing a call. For example, a call to a feature access code (i.e., *xx), together with the CLID information from the call, could be sufficient to wireline register. Additionally, wireline registration may be made with respect to more than one wireless number. For example, several wireless subscribers may wireline register at the same landline number such that certain ring patterns or tones will be caused to occur at the associated landline device 16 in accordance with calls to each of the respective subscribers.

As an alternative to the above described processing of the call to the administrative number, the administrative call may be routed to the IP 36 (in FIG. 2) via an SSP 18 triggering on the called administrative number and querying the SCP 30 for instructions. In turn, the SCP 30 may respond with instructions to send the call to the IP 36, whereupon the SSP 18 acts accordingly. Thereafter, the IP 36 engages in an exchange of information with the caller. For example, the IP 36 may store a program enabling it to "talk" to the caller and obtain information necessary for the wireline registration setup. After obtaining the necessary information, the IP 36 can then transmit the necessary information to the SCP 30 whereupon the VLR 32 and the HLR 24 are subsequently updated.

Further, the wireline registration may also be implemented automatically. As noted, the wireline registration generally is implemented at the behest of the subscriber. As explained above, a subscriber may dial an administrative number to have the wireline registration implemented. Alternatively, the wireline registration may be implemented automatically in certain situations. For example, the wireless unit 28 may interact with the landline device 16 or associated elements therewith in such a way that when the wireless unit 28 is within a certain geographical range of the landline device 16, a request for implementation of the wireline registration may be automatically sent to the appropriate landline network element. In that case, based on the request, calls to the subscriber's wireless number may be routed to the subscriber's landline number.

Operation of Wireline Registration

Calls Directed to Wireless Number

In addressing the operation of the wireline registration between the landline network 12 and the wireless network 14 when calls are placed to a subscriber's wireless number, there are four differing scenarios to consider. Two scenarios relate to a condition where the wireline registration is "on," and two scenarios relate to a condition where the wireline registration is "off" as related to calls originating from a landline device 16 or, alternatively, from a wireless unit 28. Table 1 below sets forth the four scenarios.

TABLE 1

Call Event Scenarios

|   | call from | call to | Reg. status of WU' | routed to |
|---|---|---|---|---|
| 1. | WU | WU' | "on" | LD' |
| 2. | WU | WU' | "off" | WU' |
| 3. | LD | WU' | "on" | LD' |
| 4. | LD | WU' | "off" | WU' |

Where:
"WU" is the call originating wireless unit;
"WU'" is the called wireless unit;
"LD" is the call originating landline device; and
"LD'" is the landline device associated with the wireless subscriber.

Figure 4:
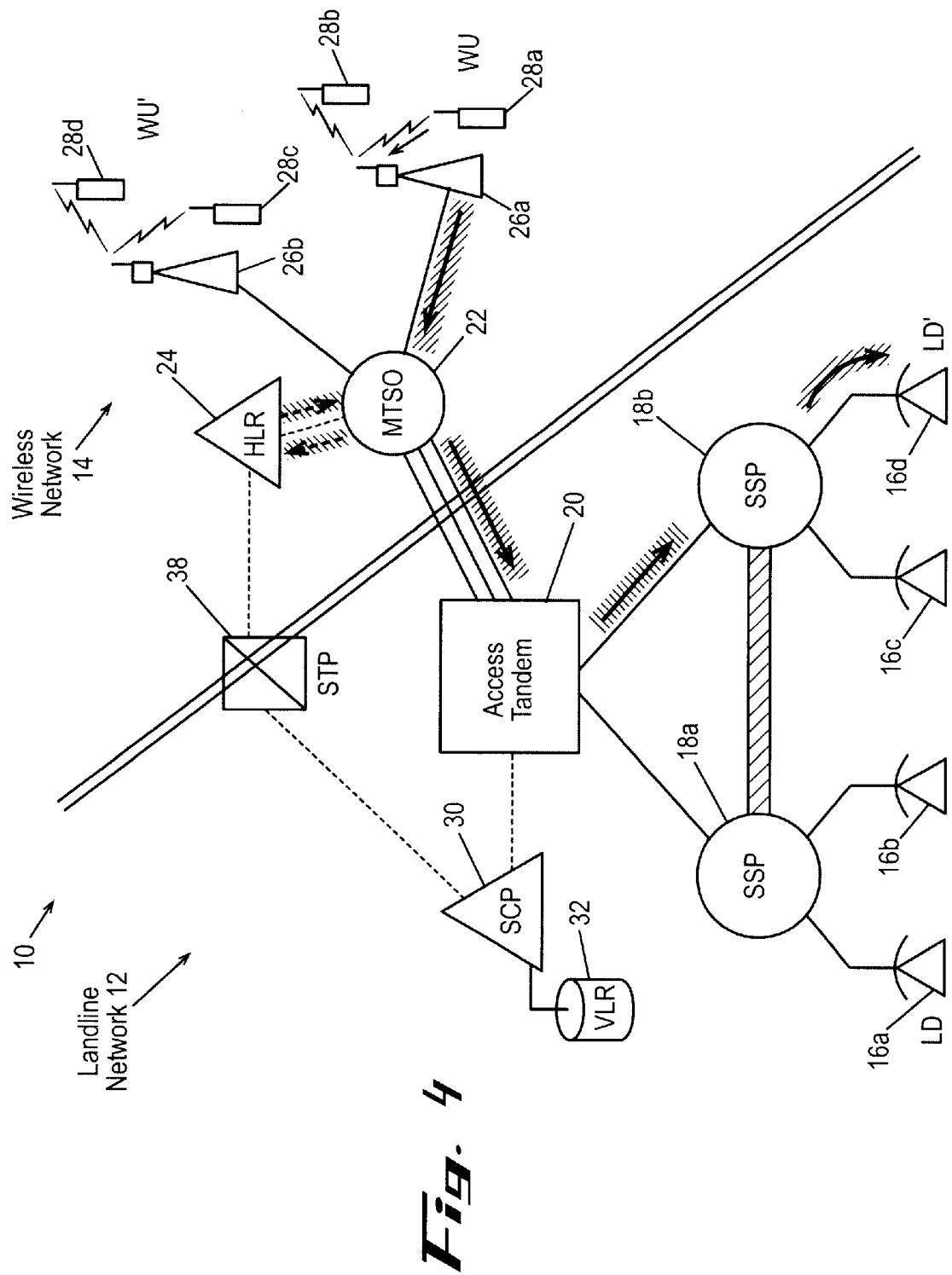
FIG. 4 is a block diagram illustrating the flow of a call placed from a first wireless unit and directed according to the disclosed embodiment to a second wireless unit.

Referring now to FIG. 4, a block diagram of the disclosed embodiment illustrates the flow of a call according to scenario No. 1 listed above in Table 1. In FIG. 4, as a result of a subscriber having effected wireline registration with wireless unit 28d in accordance with the previously described wireline registration setup, the call originating from wireless unit 28a directed to the subscriber's wireless unit 28d is automatically routed to the subscriber's landline device 16d (as indicated by the arrows in FIG. 4, the dashed arrows representing the flow of data only, and the solid arrows representing the flow of the voice connection).

More particularly, in FIG. 4, a call originating from the wireless unit 28a is received by the cell site 26a and transmitted to the MTSO 22. Next, the MTSO 22 makes a data query to the HLR 24. In the HLR 24, because the wireline registration is "on," the subscriber's landline number (base DN) is reflected as being the wireless number to which the call is routed. Therefore, in response to the query, the HLR 24 transmits back to the MTSO 22 instructions to route the call to the landline number. In following the instructions, the MTSO 22 then transmits the call out of the wireless network 14 across to the access tandem 20 in the landline network 12. Upon receipt, the access tandem 20 initiates a query into the SCP 30 and associated VLR 32 asking for instructions on where to further route the call based on the landline number received from the MTSO 22. In response to the query from the access tandem 20, the SCP 30 looks to the VLR 32 and retrieves the instructions associated with the landline number. Next, the SCP 30 transmits the instructions to the access tandem 20 directing the call to be routed to SSP 18b and then to landline device 16d. It is also important to note that, while the subscriber is wireline registered, the VLR 32 further reflects that the wireless number associated with wireless unit 28d is the landline number associated with landline device 16d in the landline network 12. Finally, from the access tandem 20, the call is routed to SSP 18b and then to landline device 16d to complete the connection.

In contrast, if the subscriber having wireless unit 28d was not wireline registered, as is represented by scenario 2 in Table 1 above, the call would have been routed in the usual course to the wireless unit 28d in the wireless network 14. More specifically, the call originating from wireless unit 28a would be received by cell site 26a and transmitted to MTSO 22. At MTSO 22, a query would have been transmitted to the HLR 24 asking for the routing instructions (which include at least a routing number) associated with the wireless number. In response to the query, the HLR 24 would transmit routing instructions back to the MTSO 22. The routing instructions would be directed at the location of the wireless unit 28d and the particular cell site 26b from which to transmit. Thereafter, the call would be transmitted to cell site 26b and then finally transmitted over the air to wireless unit 28d.

Figure 5:
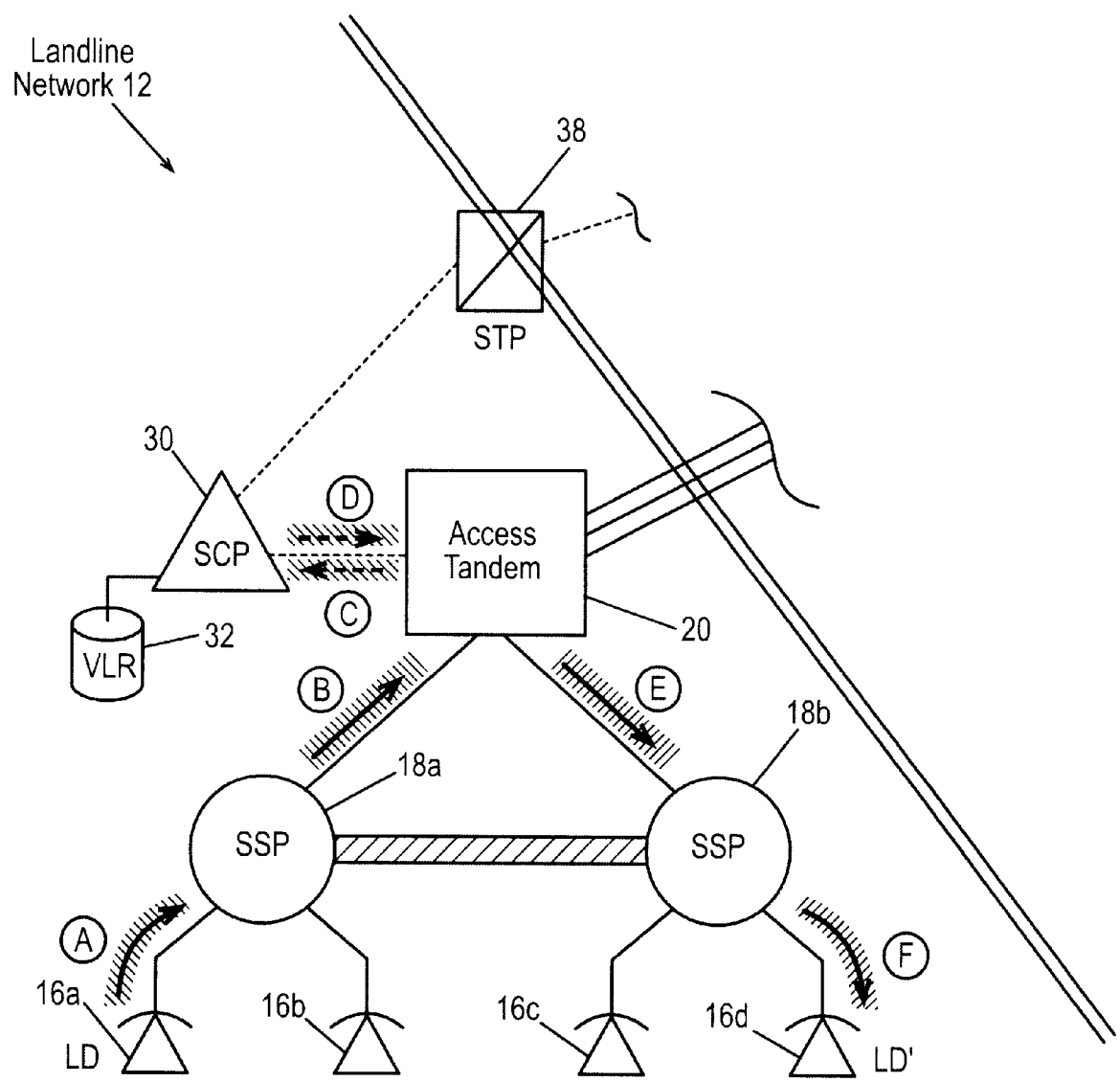
FIG. 5 is a block diagram illustrating the flow of a call placed from a first landline device and directed according to the disclosed embodiment to a wireless unit.

FIG. 5 is a block diagram illustrating Scenario 3 in Table 1 above, that is, the flow of a call placed from a first landline device 16a to a wireless unit 28d (not shown in FIG. 5) wherein the wireless unit 28d has been wireline registered at another landline device 16d to redirect the call to landline device 16d. In this scenario, the present invention alleviates the "tromboning effect" that often occurs with the use of "call forwarding" services. With the wireless unit 28d wireline registered, the call flow path required to accomplish the connection to the landline device 16d never needs to leave the landline network 12. This results in freeing up the heavily used connection lines between the access tandem 20 in the landline network 12 and the MTSO 22 in the wireless network 14. Thus, valuable time and space are not wasted on the connection lines between the networks 12 and 14 due to redundant call flow routing. In Scenario 3 there is never any need to route the call flow from the landline network 12 across to the wireless network 14, only to be routed back again to the landline network 12 (the "tromboning effect").

More particularly, in FIG. 5, a call placed from the landline device 16a directed to the wireless unit 28d (not shown) is received by the SSP 18a. At the SSP 18a, the call is transmitted to the access tandem 20, where a TAT trigger is activated and a query is initiated into the SCP 30 and associated VLR 32. From the TAT trigger the access tandem 20 transmits the query to the SCP 30 asking for routing instructions based on the wireless number dialed at the landline device 16a. Upon receiving the query, the SCP 30 looks to the VLR 32 for the current routing instructions associated with the wireless number. Because the subscriber associated with wireless unit 28d has previously been wireline registered at landline device 16d, the wireless number will now appear in the VLR 32 to be the landline number associated with landline device 16d. Accordingly the wireless number will also appear in the HLR 24 in the wireless network 14 to also look like the landline number associated with landline device 16d. Next, the SCP 30 transmits the routing instructions obtained from the VLR 32 to the access tandem 20. Because wireline registration is "on," the call is directed to SSP 18b and thereafter to landline device 16d. Once the routing instructions have been received by the access tandem 20 and interpreted, the call is physically routed to SSP 18b, whereby it is finally transmitted to landline device 16d to complete the connection.

As can be seen, the call flow routing never left the landline network 12 to complete the connection. The call flow and routing can be seen in FIG. 5 as indicated by the directional arrows A, B, C, D, E, and F (the dashed arrows representing the flow of data only and the solid arrows representing the flow of the voice connection). This is very advantageous over any "call forwarding" services that are currently provided today in the telecommunications industry. In the "call forwarding" situation, the call placed at landline device 16a would have been routed through SSP 18a to the access tandem 20 and thereafter across the networks to the MTSO 22 (not shown in FIG. 5) in the wireless network 14. At the MTSO 22, the wireless number dialed at landline device 16a would then be looked up in the HLR 24 to retrieve further routing instructions. However, at this point, an activated "call forwarding" feature would then instruct the MTSO 22 to route all calls directed to the wireless number back over to the landline number associated with landline device 16d. Once the MTSO 22 receives the routing instructions from the HLR 24, the call would then be routed back across the networks to the access tandem 20 with instructions to route the call to the landline number associated with landline device 16d. Having received the instructions from the MTSO 20 in the wireless network 14, the access tandem 20 now queries the SCP 30 and associated VLR 32 asking for the routing instructions corresponding to the landline number associated with landline device 16d. From this point on, the usual course of events is followed, and the call is routed to SSP 18b and thereafter to landline device 16d.

In contrast to the call routing achieved by the present invention with the subscriber having wireline registered, the call would be routed in the normal fashion. That is, the call would be routed from landline device 16a to SSP 18a and then on to the access tandem 20. Upon reaching the access tandem 20, the SCP 30 and associated VLR 32 would be queried for appropriate routing instructions based on the wireless number dialed. The instructions would direct the call to be routed over to the wireless network 14. Therefore, the call would be routed from the access tandem 20 in the landline network 12 to the MTSO 22 (not shown in FIG. 5, see FIGS. 2 and 4 for wireless network 14 layout) in the wireless network 14. Next, the MTSO 22 would query the HLR 24 asking for the remaining routing instructions based on the wireless number dialed at landline device 16a. After receiving the appropriate routing instructions, the call would then be routed to cell site 26b (see FIGS. 2 and 4) and thereafter transmitted over the air to wireless unit 28d to complete the connection.

Accordingly, the call routing capabilities of the present invention provide significant improvements over the call routing schemes currently used today in the telecommunications industry. The present invention allows for a more efficient and cost effective call routing between the landline and wireless networks 12 and 14. With the operational aspects of the present invention having now been described in detail, the cancellation of the wireline registration feature will be addressed next.

Cancellation of Wireline Registration

Figure 6:
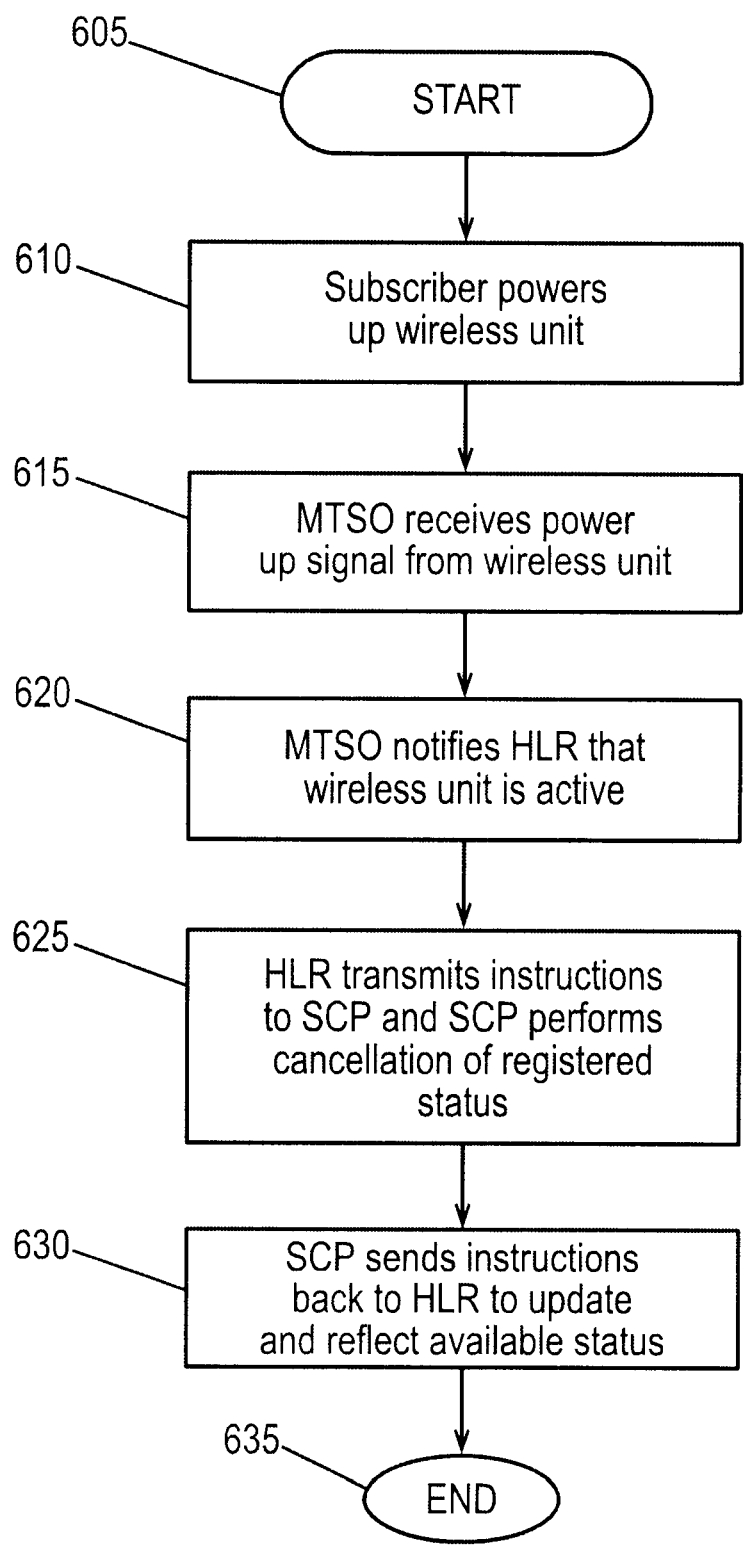
FIG. 6 is a flow diagram illustrating the steps taken according to the disclosed embodiment for canceling a registration.

With reference now to FIG. 6, a flow diagram illustrating the general steps for canceling the wireline registration is shown as method 600. Method 600 begins at step 605 and proceeds to step 610. At step 610, the subscriber powers up his or her wireless unit 28 (see FIG. 2 for equipment layout and reference). Upon being powered up, the wireless unit automatically transmits a signal which notifies the wireless network 14 that the subscriber is active and ready to receive a call. Next, at step 615, the MTSO 22 receives the power up signal and identifies it with the wireless unit 28. After receiving the power up signal and interpreting it, the MTSO 22 at step 620 notifies the HLR 24 that the wireless unit 28 is active and ready to receive calls. At this point, at step 625, the HLR 24 transmits instructions to the SCP 30 and associated VLR 32 in the landline network 12 to cancel the wireline registration for the respective subscriber associated with wireless unit 28. In canceling the wireline registration, the SCP 30 updates the data in the VLR 32 to reflect that the wireline registration status is "off," and the normal routing numbers are listed as current. From step 625, the method 600 proceeds to step 630. At step 630, the SCP 30 now transmits instructions back to the HLR 24 in the wireless network 14 to update its data to reflect the normal routing numbers as current and that the wireless unit 28 is available. Once the VLR 32 and HLR 24 registers in the respective landline and wireless networks 12 and 14 have been appropriately updated, the method 600 proceeds to step 635 and ends.

Accordingly, to effect the cancellation of the wireline registration, the subscriber need only power up their wireless unit. Alternatively, other means for causing the cancellation of the wireless registration may be employed such as, for example, additionally requiring the subscriber to confirm the request for cancellation by dialing a certain access code (i.e., *xx) after powering up their respective wireless unit 28. In this instance, the subscriber would have the option to continue the wireline registration status and have all calls directed to the wireless number redirected to the subscriber's landline number while still being able to place calls from the wireless unit 28.

In summary, the routing of telephone calls initially directed to a wireless unit located in the wireless network, to a landline device located in the landline network, is primarily accomplished by registering the wireless unit with the landline network. The registering is accomplished by dialing an administrative number from the landline device where the subscriber wants their wireless calls to be directed to. Once the administrative number is received by the access tandem in the landline network, a query is made by the access tandem into the SCP and associated VLR to see if the subscriber is identified and verified. If so, the wireline registration feature is set to the "on" state in the VLR in the landline network. Once set to the "on" state, the information is subsequently transmitted to the HLR in the wireless network. Upon receipt, the information within the HLR is updated so to instruct that all calls directed to the subscriber's wireless number are to be directed to the landline number of the landline device from which the subscriber registered. The information transmitted to the HLR in the wireless network is directly from the SCP and associated VLR located in the landline network. Hence, the VLR in the landline network directly communicates with the HLR in the wireless network in order to keep both the landline and the wireless networks up to date as to the registration status and specific routing for the various subscribers.

By providing the capability for the VLR in the landline network to directly communicate with the HLR in the wireless network, both networks will be able to route the calls efficiently and thereby alleviate the tromboning effect that often occurs when calls are redirected from a wireless unit to a landline device.

Accordingly, an advantage of the present invention is that it provides a method and system that overcomes the problems associated with a telecommunications subscriber having to keep track of two different numbers and possibly having to dial two different numbers (a landline number and a wireless number) in order to reach a subscriber on the move who utilizes both landline and wireless services.

Another advantage of the present invention is that it provides a method and system that prevents the "tromboning effect" with respect to the routing of a call or other communication from a first device to a second device.

Another advantage of the present invention is that it provides a method and system that prevents the tromboning effect with respect to the routing of a call or other communication between two communication networks, the "tromboning effect" being where a call or other communication originates with a first network, is routed to a second network, and then is re-routed for termination or connection to back to a device operating in the first network.

The foregoing system and methods of the present invention may be conveniently implemented in various telecommunications environments based upon the flow charts in FIGS. 3 and 6 as well as the illustrations in FIGS. 2, 4 and 5. No particular arrangement of equipment has been required for carrying out the various procedures described above because it is considered that the operations, steps, procedures and equipment arrangements described above and illustrated in the accompanying drawings are sufficiently disclosed to permit one of ordinary skill in the art to practice the present invention. Moreover, there are many various equipment arrangements and procedures which may be used to practice the present invention, and therefore no detailed arrangement and method could be provided which would be applicable to all of these many different systems.

The present invention has been described in relation to particular embodiments which are intended in all respects to be illustrative rather than restrictive. The particular embodiment described is one of registering the wireless unit by dialing an administrative number from the landline device where the subscriber wants their wireless calls to be directed, updating the information within the HLR to instruct that all calls directed to the subscriber's wireless number are to be directed to the landline number associated with the landline device from which the subscriber registered, providing the capability for the VLR in the landline network to directly communicate with the HLR in the wireless network, and thereby routing calls between both networks efficiently and cost effectively such that the "tromboning effect" that often occurs when calls are redirected from a wireless unit to a landline device is alleviated. However, those skilled in the art will understand that the principles of the present invention apply to any tasks or processes that require the VLR and HLR registers, or equivalents thereof, to communicate with one another in order to accomplish the routing communications between two environments.

Alternative embodiments will become apparent to those skilled in the art to which the present invention pertains without departing from its spirit and scope. Accordingly, the scope of the present invention is defined by the appended claims rather than the foregoing description.

What is claimed is:

1. In a telecommunications system including a wireless network and a landline network, the wireless network having a mobile telephone switching office (MTSO) and serving a wireless unit associated with a wireless number, the landline network including a landline network element and serving a landline device associated with a landline number, a method for routing communications directed to the wireless number to the landline device, the method comprising the steps of:

A. making a registration of the wireless unit with the landline network element; and B. transmitting a signal from the landline network element to the MTSO identifying the wireless unit as being registered; and C. in response to the signal being sent to the MTSO, causing the MTSO to route a communication intended for the wireless number to the landline device.

2. The method of claim 1 wherein the landline network element includes information associating the wireless number and the landline number, and wherein Step A comprises the steps of:

receiving identification information associated with a call from the landline number directed to an administrative number;

making a recognition of the call directed to the administrative number as indicative of a request for the registration of the wireless unit, the recognition being based on the identification information associated with the call and on the information associating the wireless number and the landline number; and making the registration of the wireless unit with the landline network element.

3. The method of claim 2, after the step of making a recognition of the call, further comprising the step of validating the landline number with respect to entitlement of the registration.

4. The method of claim 1 further comprising, after Step B, Step B' of transmitting a confirmatory message to the landline network element from the MTSO after the message is received.

5. The method of claim 4 further comprising, after Step B', Step B" of making a confirmatory announcement of the registration to the call after the confirmatory message is received.

6. The method of claim 2 further comprising the steps of providing a menu of options to the call after making the recognition of the call and making a confirmatory announcement of a selection of an option to the call.

7. The method of claim 2 further comprising the step of making a recognition of an additional call directed to the administrative number as indicative of a request for the registration of an additional wireless unit, the recognition being based on the identification information associated with the additional call and on the information associating the wireless number and the landline number.

8. The method of claim 2 further comprising, after making a registration of the wireless unit, the step of triggering a query in the landline network element after receiving a call directed to the wireless number.

9. The method of claim 8, wherein the step of triggering a query in the landline network element comprises determining the landline number associated with the wireless number.

10. A telecommunications system comprising:
a wireless network serving a wireless unit associated with a wireless number;
a landline network serving a landline device associated with a landline number, said landline network being functionally coupled to said wireless network to facilitate the routing of telecommunications therebetween;
switching means operatively associated with said wireless network;
routing means functionally coupled to said landline network and being selectively operative for routing telecommunications directed to said wireless number to the landline device associated with said landline number; and
control means functionally coupled to said routing means and to said switching means, said control means being operative to receive and to store a registration signal corresponding to a registration of said wireless unit and to transmit an activation signal to said switching means after receiving said registration signal; and
whereby said switching means is operative in response to receipt of said activation signal to route a signal intended for said wireless number to said landline device.

11. The telecommunications system of claim 10, wherein said routing means comprises:
means for receiving identification information associated with a call directed to an administrative number from said landline device;
means for recognizing said call directed to said administrative number as indicative of a request for registration of said wireless unit, said recognizing being based on said identification information associated with the call and on information associating said wireless number and said landline number; and
means for providing said control means with data after said recognizing step, said data comprising said identification information associated with said call and said information associating the wireless number with said landline number, whereby said control means makes the registration of said wireless unit with said landline network element in accordance with said data.

12. The telecommunications system of claim 10, wherein said control means comprises a service control point having a visitor location register functionally coupled thereto, and said switching means comprises a mobile telephone switching office having a home location register functionally coupled thereto.

13. The telecommunications system of claim 11, wherein said routing means further comprises means for validating said landline number with respect to entitlement of said registration.

14. A telecommunications system including a wireless network and a landline network that are functionally coupled to facilitate the routing of telecommunications therebetween, the wireless network having a mobile telephone switching office (MTSO) and serving a wireless unit associated with a wireless number, the landline network serving a landline device associated with a landline number and including a landline network element for routing communications directed to the wireless number to the landline device associated with the landline number, the landline network element comprising:
a service control point (SCP) functionally coupled to the landline network element and operative to make a registration of the wireless unit, and to transmit a message to the landline network element after the registration, the message identifying the wireless unit such that the landline network element routes a communication received for the wireless number to the landline device; and
an intelligent peripheral functionally coupled to the landline network element and the SCP, the intelligent peripheral operative to provide a menu of options to a call and making a confirmatory announcement after a selection of an option to the call.

15. The landline network element of claim 14, further comprising:
means for receiving identification information associated with the call directed to an administrative number from the landline device;
means for making a recognition of the call directed to the administrative number as indicative of a request for the registration of the wireless unit, the recognition being based on the identification information associated with the call and on the information associating the wireless number and the landline number; and
means for providing the SCP with data after the recognition is made, the data comprising the identification information associated with the call and the information associating the wireless number with the landline number, whereby the SCP makes the registration of the wireless unit with the landline network element in accordance with the data.

16. The method of claim 2 further comprising the step of making a recognition of an additional call directed to the administrative number as indicative of a request for the registration of an additional wireless unit, the recognition being based on the identification information associated with the additional call and on the information associating the wireless number and the landline number.

17. The method of claim 1 further comprising the step of canceling the registration of the wireless unit after receiving a power up signal transmitted from the wireless unit.

18. The method of claim 1 further comprising the step of canceling the registration of the wireless unit after receiving instructions from the landline device.

19. In a telecommunications system including a wireless network and a landline network, the wireless network having a mobile telephone switching office (MTSO) capable of accessing an associated home location register (HLR) having a routing number stored therein, the MTSO serving a wireless unit having an associated wireless number associated with a subscriber, the wireless number being associated with the routing number, the landline network including a landline network element and serving a landline device associated with a landline number, a method for routing communications directed to the wireless number to the landline device, the method comprising the steps of:

registering the wireless unit with the landline network element;

making the landline number associated with the landline device appear as the routing number associated with the wireless number of the subscriber in the home location register;

receiving a call in the wireless network at the MTSO directed to the wireless number associated with the subscriber;

locating the routing number in the home location register of the MTSO associated with the wireless number; and routing the call to the landline device associated with the landline number.

20. In a telecommunications system including a wireless network and a landline network, the wireless network serving a wireless unit associated with a wireless number associated with a subscriber, the landline network including a landline network element and serving a landline device associated with a landline number, the telecommunications system including an access tandem functionally coupled between the landline network element and the wireless network, a method for routing communications directed to the wireless number to the landline device associated with the landline number, the method comprising the steps of:

A. making the landline number associated with the landline device appear as a routing number associated with the wireless number of the subscriber in a location register of the landline network element;

B. receiving a call at the access tandem directed to the wireless number associated with the subscriber;

C. pausing the processing of the call in the access tandem and querying the landline network element for instructions;

D. locating the routing number in the location register of the landline network element associated with the wireless number called after receipt of the query;

E. transmitting routing instructions to the access tandem from the landline network element after locating the routing number associated with the wireless number in the location register; and F. routing the call via the access tandem to the landline device associated with the landline number.

21. A telecommunications system having a wireless network and a landline network functionally coupled to facilitate the routing of telecommunications therebetween, the wireless network serving a wireless unit associated with a wireless number, the landline network serving a landline device associated with a landline number, the landline network comprising:

an access tandem for routing communications directed to the wireless number to the landline device associated with the landline number; and a service control point (SCP) functionally coupled to the access tandem and operative to make a registration of the wireless unit, and to transmit a message to the access tandem after the registration, the message identifying the wireless unit such that the access tandem routes a communication received for the wireless number to the landline device.

* * * * *